United States Patent
Mayor

(10) Patent No.: US 12,537,778 B2
(45) Date of Patent: Jan. 27, 2026

(54) QUALITY-OF-SERVICE (QOS)-BASED DYNAMIC BANDWIDTH ALLOCATION METHODS AND SYSTEMS FOR CABLE AND OPTICAL DATA NETWORKS

(71) Applicant: Beegol Corporation, Sao Paulo (BR)

(72) Inventor: Gilberto Mayor, Sao Paulo (BR)

(73) Assignee: Beegol Corporation, Sao Paulo (BR)

( * ) Notice: Subject to any disclaimer, the term of this patent is extended or adjusted under 35 U.S.C. 154(b) by 17 days.

(21) Appl. No.: 18/778,966

(22) Filed: Jul. 20, 2024

(65) Prior Publication Data

US 2026/0025342 A1     Jan. 22, 2026

(51) Int. Cl.
   *H04L 47/80*     (2022.01)
   *H04L 47/24*     (2022.01)
   *H04L 47/50*     (2022.01)

(52) U.S. Cl.
   CPC ............ *H04L 47/805* (2013.01); *H04L 47/24* (2013.01); *H04L 47/50* (2013.01)

(58) Field of Classification Search
   CPC ........ H04L 47/805; H04L 47/24; H04L 47/50
   See application file for complete search history.

(56) References Cited

U.S. PATENT DOCUMENTS

| | | | | |
|---|---|---|---|---|
| 6,205,149 B1 * | 3/2001 | Lemaire | ............. | H04L 47/24 370/400 |
| 6,226,265 B1 * | 5/2001 | Nakamichi | ......... | H04L 12/5602 370/235 |
| 6,996,117 B2 * | 2/2006 | Lee | ............. | H04L 47/623 370/429 |
| 7,349,403 B2 * | 3/2008 | Lee | ............. | H04L 12/56 370/395.5 |
| 8,077,611 B2 * | 12/2011 | Bettink | ............. | H04L 47/2441 370/230 |
| 8,179,800 B1 * | 5/2012 | Gunduzhan | ............. | H04L 47/215 370/235 |
| 8,218,438 B1 * | 7/2012 | Howe | ............. | H04L 47/10 370/230.1 |
| 8,830,830 B2 * | 9/2014 | Mani | ............. | H04L 47/10 370/230.1 |

(Continued)

*Primary Examiner* — David R Lazaro
(74) *Attorney, Agent, or Firm* — Invent Capture, LLC.; Samuel S. Cho

(57) ABSTRACT

A novel dynamic bandwidth allocation system and a method of its operation incorporate a quality-of-service (QoS)-based media access control (MAC) layer controller, which is able to dynamically allocate data transmission capacity (i.e. bandwidth) to multiple incoming service flows of data packets for multiple subscribers more efficiently with less network congestions and service inconsistencies than conventional MAC layer management methods. The QoS-based MAC layer controller is able to determine and place incoming service flows into two separate states of token buckets (i.e. conforming or non-conforming), wherein the conforming token bucket utilizes a longer filtering interval (e.g. 1 second) and the non-conforming token bucket utilizes a shorter filtering interval (e.g. 1 ms) for detecting token bucket violations. The QoS-based MAC layer controller is able to utilize either conforming or non-conforming states flexibly and intelligently to minimize unnecessary packet droppages, network congestions, or speed degradations during bursty and oscillating network traffic.

9 Claims, 6 Drawing Sheets

A State Diagram for Quality-of-Service (QoS)-Based Dynamic Bandwidth Allocation Media Access Control (MAC) Layer Controller

(56) References Cited

U.S. PATENT DOCUMENTS

| | | | |
|---|---|---|---|
| 9,148,378 B2* | 9/2015 | Kitada | H04L 47/20 |
| 2003/0152076 A1* | 8/2003 | Lee | H04L 47/623 |
| | | | 370/389 |
| 2003/0152084 A1* | 8/2003 | Lee | H04L 12/56 |
| | | | 370/395.5 |
| 2004/0064582 A1* | 4/2004 | Raghunath | H04L 47/6215 |
| | | | 709/240 |
| 2014/0359112 A1* | 12/2014 | Sarusi | H04L 49/9078 |
| | | | 709/224 |

* cited by examiner

Two Main Components in a Conventional MAC Layer Management

An Example of a Data Network Component Incorporating a MAC Layer Controller for MAC Layer Management

300

An Example of Internal Elements of a Token Bucket in a Media Access Control (MAC) Layer Controller An Example of Internal Elements of a Scheduler in a Media Access Control (MAC) Layer Controller A Block Diagram for Novel Quality-of-Service (QoS)-Based Dynamic Bandwidth Allocation Media Access Control (MAC) Layer Controller

500

A State Diagram for Quality-of-Service (QoS)-Based Dynamic Bandwidth Allocation Media Access Control (MAC) Layer Controller

600

QUALITY-OF-SERVICE (QOS)-BASED DYNAMIC BANDWIDTH ALLOCATION METHODS AND SYSTEMS FOR CABLE AND OPTICAL DATA NETWORKS

BACKGROUND OF THE INVENTION

The present invention generally relates to one or more electronic systems and methods for improving speed and efficiency in cable and/or optical data networks. More specifically, various embodiments of the present invention relate to quality of service (QoS)-based dynamic bandwidth allocation methods and systems that improve speed and efficiency of cable and/or optical data networks.

In an Open System Interconnections (OSI) model for data networks, a media access control (MAC) layer is a sublayer of the data link layer, which accommodates node-to-node data transfers. The data link layer detects, and if desired, corrects errors that may occur in the physical layer. The data link defines the protocol to establish and terminate a connection between two physically connected devices and also defines the protocol for flow control between nodes. The primary function of the MAC layer within the data link layer is to control access to the physical transmission medium, such as gigabit passive optical networks (GPON) or Data Over Cable Service Interface Specification (DOCSIS) networks, and facilitate the reliable transfer of data between devices on the same network. In particular, in most network management scenarios, the MAC layer is responsible for policing and scheduling both incoming and outgoing packets.

In case of optical data networks, gigabit passive optical networks (GPON) have an equipment called an "optical line terminal" (OLT) that manages all optical network terminals (ONTs) connected to it. It implements the data link layer as well as the MAC layer contained within the data link layer. An OLT is a crucial component in a GPON (gigabit passive optical network) system. It is located at the service provider's central office or data center and serves as the endpoint of the optical distribution network (ODN). The OLT manages and controls the communication between the service provider's network and the customer premises equipment (CPE) in a GPON network.

In case of cable data networks, Data Over Cable Service Interface Specification (DOCSIS) networks have an equipment called a Cable Modem Termination System (CMTS) that manages all modems connected to it. A DOCSIS network implements the data link layer as well as the MAC layer contained within the data link layer. A CMTS is a crucial component in a DOCSIS network that serves as the central point of control for cable modem communications within the DOCSIS network. The primary function of a CMTS is to manage upstream and downstream data traffic between cable modems and the Internet.

For both GPON and DOCSIS networks, each data packet arrival is subject to a token bucket policing mechanism (i.e. for regulation of packet transmission speed at a contracted rate per subscriber), and a packet is queued if there is an available token. A scheduler manages the queues of data packets and orderly sends the packets downstream (i.e. from CMTS to modems, or from OLTs to ONTs) according to a delivery schedule. In a conventional implementation of the token bucket policing scheme in a GPON or a DOCSIS network, a token bucket filters data packets according to the contracted rate.

For example, if a subscriber's modem has a contract of 300 Mbps downstream, the token rate will deliver a maximum of 300 Mbps "packets stream" to that subscriber's modem using a scheduler. In the conventional implementation of the token bucket policing scheme, this scheduler allocates a particular bandwidth to each queue according to a particular contracted rate of a subscriber, and takes the data packets out of the queue and sends them downstream based on the contracted rate of the subscriber. One way to conceptualize the magnitude of the contracted rate is using a "service flow" (SF) model. For example, if Service Flow 1 (SF1) has twice the bandwidth of Service Flow 2 (SF2), then the scheduler is configured to deliver twice as many packets for SF1 than SF2 when queues are full.

Unfortunately, there are significant shortcomings and problems with the conventional MAC layer implementation. For instance, the token bucket queues or discards packets when a service flow (SF) exceeds the contracted rate, even if there is bandwidth available in the data network infrastructure. Moreover, the conventional MAC layer implementation is unable to provide optimized outputs when short-time "bursts" of packet transmission fluctuations occur. If the bandwidth temporarily increases during a short period of time, data packets will be queued even if the average bandwidth is below the contracted rate.

Furthermore, in the conventional MAC layer implementation, the scheduler statically allocates the bandwidth according to the contracted rate, which results in inefficient delays of bandwidth adjustments when a Service Flow (SF) needs more bandwidth. Another shortcoming of the conventional MAC layer implementation is that all network traffic is classified as "best efforts," unless there is reserved bandwidth. As a case in point, the conventional MAC layer implementation is unable to deliver quality-of-service (QoS) requirements, such as guaranteeing that the probability of latency exceeding 100 milliseconds is less than a specific percentage.

Therefore, it may be desirable to devise a novel electronic system and a related method of its operation that can provide more flexible and efficient MAC layer management via intelligent and dynamic allocation of available capacity in data packet queuing and downstream transmission scheduling.

Furthermore, it may be also desirable to devise a novel electronic system and a related method of its operation that can reliably accommodate and enforce a quality-of-service (QoS) goal in a downstream MAC layer whenever possible.

Moreover, it may be also desirable to devise a novel electronic system and a related method of its operation that can provide a realistic forecasting model for incoming network traffic, wherein the realistic forecasting model takes account of the current state of network traffic as well as future traffic arrivals, and enables the novel electronic system to allocate available bandwidth dynamically for optimal resource utilization and efficiency.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a method for operating a quality-of-service (QoS)-based dynamic bandwidth allocation media access control (MAC) layer controller in a data network is disclosed. This method comprises the steps of: (1) receiving multiple service flows of data packets in the QoS-based dynamic bandwidth allocation MAC layer controller, wherein each service flow in the multiple service flows of data packets represents data communication with a specific subscriber's device connected to the data network; (2) utilizing a QoS state determination logic in the QoS-based dynamic bandwidth allocation MAC layer controller to determine and categorize each service flow in the multiple service flows to be either in a conforming state or in a non-conforming state, wherein a service flow is categorized as conforming if a token bucket violation does not occur within a longer filtering interval of token bucket monitoring, and wherein the service flow is categorized as non-conforming if the token bucket violation occurs within the longer filtering interval; (3) placing the service flow into a conforming token bucket if the QoS state determination logic categorized the service flow to be in the conforming state, wherein the conforming token bucket utilizes the longer filtering interval to monitor and detect a future token bucket violation from the service flow; (4) placing the service flow into a non-conforming token bucket if the QoS state determination logic categorized the service flow to be in the non-conforming state, wherein the non-conforming token bucket utilizes a shorter filtering interval to monitor and detect the future token bucket violation from the service flow; (5) redirecting the service flow going to the non-conforming token bucket to the conforming token bucket and re-categorizing a current state to be in the conforming state, if the QoS state determination logic does not detect the future token bucket violation under the shorter filtering interval of the non-conforming token bucket in the non-conforming state for a defined number of monitoring cycles; (6) queuing the service flow of data packets that have been monitored, categorized, and filtered by the conforming token bucket and the non-conforming token bucket in a quality-of-service (QoS) scheduler for downstream transmission; and (7) transmitting the service flow to nodes external to the QoS-based dynamic bandwidth allocation MAC layer controller in the data network.

DETAILED DESCRIPTION

Figure 1:
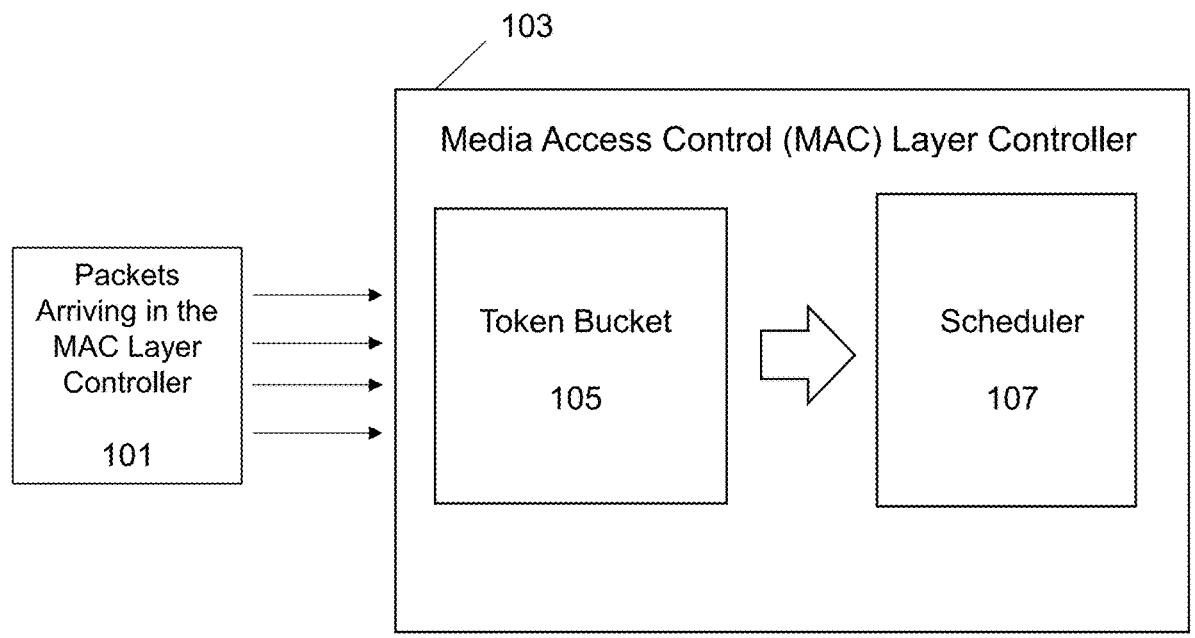
FIG. 1 shows two main components of a media access control (MAC) layer controller in a conventional MAC layer management.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more novel quality-of-service (QoS)-based dynamic bandwidth allocation media access control (MAC) layer controller systems and methods of operating thereof for MAC layer management. These descriptions and representations are the means used by those experienced or skilled in the art to convey the substance of their work most effectively to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

For the purpose of describing the invention, a term herein referred to as "bandwidth" is defined as a data transmission capacity of a data network for computers and other electronic devices connected to the data network. In context of an embodiment of the present invention, a "dynamic bandwidth allocation" refers to an intelligent and flexible technique executed in one or more network layers (e.g. a media access control (MAC) layer) to reserve, distribute, and/or change the data transmission capacity of a data network for various electronic devices connected to the data network, depending on the real-time changes in input and predictive network health parameters.

Furthermore, for the purpose of describing the invention, a term herein referred to as "quality-of-service," or "QoS," is defined as a measurable and quantifiable parameter of data network service quality to a data network subscriber's device connected to the data network. For example, a data network guaranteeing a maximum network latency rate, or alternatively, guaranteeing the probability of latency exceeding the maximum network latency rate to be under a specific percentage to a network subscriber, is providing a quality-of-service (QoS) guarantee to the network subscriber. Other examples of QoS parameters include network service quality guarantees for upload speed or download speed over a specific period, and probability guarantees for avoiding network congestion and/or delays relative to a subscriber's contracted rate during certain hours in a day. Typically, a QoS parameter directly or indirectly impacts a network subscriber's satisfaction with a data network service provider (e.g. an Internet service provider (ISP)) over network service quality.

Moreover, for the purpose of describing the invention, a term herein referred to as "computer server" is defined as a physical computer system, another hardware device, a software module executed in an electronic device, or a combination thereof. Furthermore, in one or more embodiments of the invention, a computer server is physically or wirelessly connected to one or more data networks, such as a local area network (LAN), a wide area network (WAN), an optical data network, a cellular network, and the Internet. Moreover, in one or more embodiments of the invention, a group of computer servers may be flexibly scaled up or down to constitute a cloud computing network to process large volumes of data packets over the network and to execute a quality-of-service (QoS)-based dynamic bandwidth allocation at the media access control (MAC) layer.

One aspect of an embodiment of the present invention is providing a novel electronic system and a related method of its operation that enable flexible and efficient MAC layer management via intelligent and dynamic allocation of available network capacity in data packet queuing and downstream transmission scheduling.

Another aspect of an embodiment of the present invention is providing a novel electronic system and a related method of its operation that can reliably accommodate and enforce a quality-of-service (QoS) goal in a downstream MAC layer whenever possible.

Another aspect of an embodiment of the present invention is providing a novel electronic system and a related method of its operation that can generate and utilize a realistic forecasting model of incoming network traffic, wherein the realistic forecasting model takes account of the current state of network traffic as well as future traffic arrivals, and enables the novel electronic system to allocate available bandwidth dynamically for optimal resource utilization and efficiency.

Yet another aspect of an embodiment of the present invention is providing a novel quality-of-service (QoS)-focused dynamic bandwidth allocation method to a data network service provider to enhance its network subscriber satisfaction rates in terms of minimized network congestions, speed degradations, unnecessary packet droppages, and downtimes.

In broadband data networks, hybrid fiber cable (HFC) networks and gigabit Ethernet passive optical networks (GPON) are two predominant technologies that are widely utilized by network operators. FIG. 1 shows two main components (105, 107) of a media access control (MAC) layer controller (103) in a conventional media access control (MAC) layer management (100). Both HFC networks and GPON utilize similar downstream traffic management techniques based on a token bucket (105) and a scheduler (107) that typically uses weighted fair queueing (WFQ). In a typical MAC layer management configuration as shown in FIG. 1, the token bucket (105) filters packets (101) arriving in the media access control (MAC) layer controller (103) in an attempt to ensure that each packet's profile is compliant with a data network subscriber's contracted rate with the network service provider. Furthermore, the scheduler (107) is configured to share the downstream transmission capacity among various incoming packet traffic flows associated with multiple subscribers based on each subscriber's contracted rate.

Figure 2:
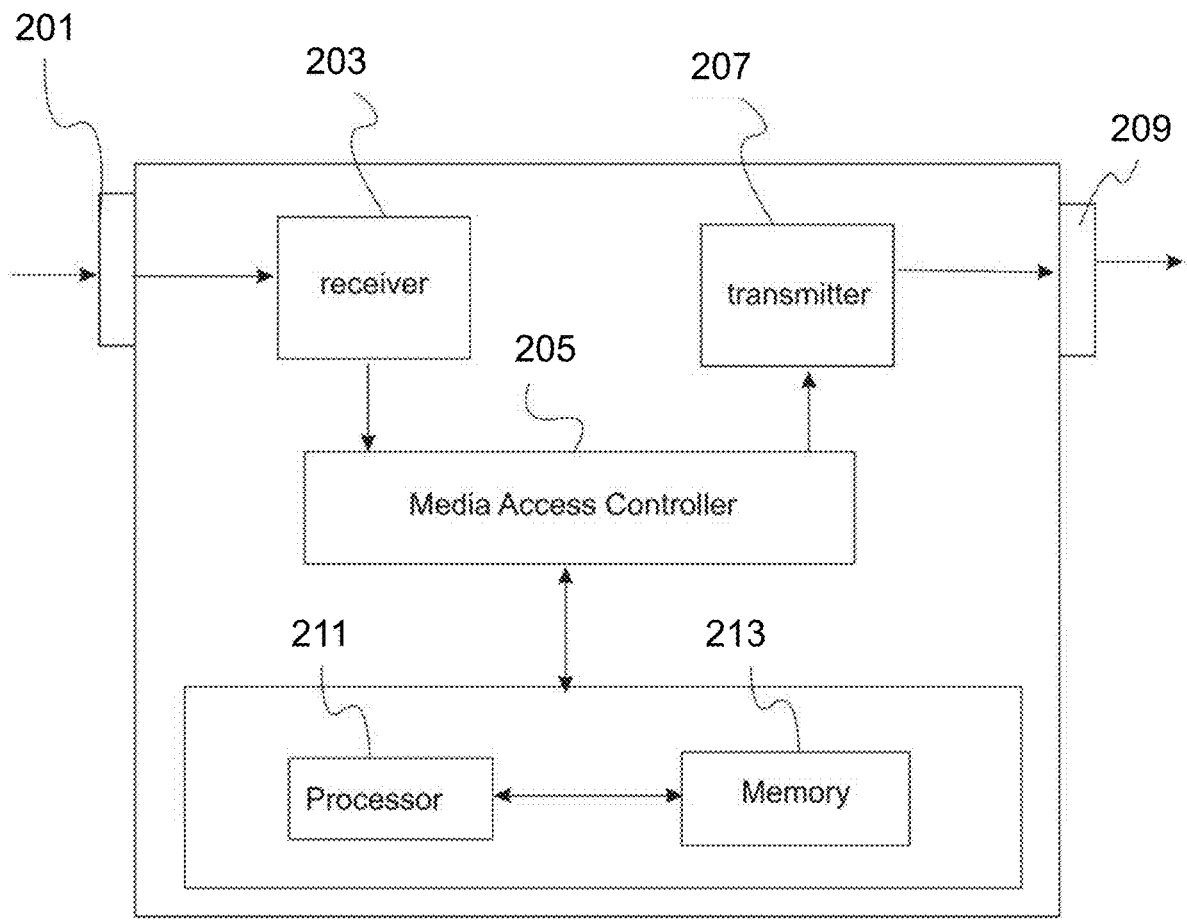
FIG. 2 shows an example of a data network component incorporating a media access control (MAC) controller for MAC layer management.

FIG. 2 shows an example of a data network component (200) incorporating a media access control (MAC) controller (205) for MAC layer management. The media access control (MAC) layer controller (103) that incorporates the token bucket (105) and the scheduler (107), as previously described in association with FIG. 1, is an example of the MAC controller (205), which is further integrated into the data network component (200) in FIG. 2. In the example as illustrated in FIG. 2, the data network component (200) comprises an input connection (201), a receiver unit (203) that receives data packets through the input connection (201), the MAC controller (205), a processor unit (211) that provides controlling instructions to the MAC controller (205), a memory unit (213) that stores instructions and data, and a transmitter unit (207) connected to an output connection (209) that sends the processed data packets based on packet priorities and subscriber contracted rates.

The data network component (200) as illustrated in FIG. 2 is compliant with a Cable Modem Termination System (CMTS) and Data Over Cable Service Interface Specification (DOCSIS), which are widely utilized in broadband data networks. In this instance, DOCSIS specifies the media access control (MAC) layer and physical layer standards for broadband Internet delivered over a hybrid fiber cable (HFC) network. In a DOCSIS network, a CMTS has fiber connections to an upstream router to the Internet and to downstream fiber-to-coaxial nodes near subscribers. In many instances of network implementation, these downstream nodes are configured to translate traffic received on the fiber to relay to subscriber cable modems via coaxial cable, forming a Hybrid Fiber-Coaxial network. Typically, a CMTS connects to tens of fiber-to-coaxial nodes, and each node serves a segment of cable modems that share the coaxial medium.

In most network implementations, the CMTS is configured to control how cable modems access the shared coaxial medium. The DOCSIS specifies an asymmetric data path, with upstream (i.e. modem to CMTS to Internet) and downstream (i.e. Internet to CMTS to modem) data flows on separate frequencies. In DOCSIS 3.1, for example, the upstream bandwidth is 1 Gbps and the downstream bandwidth is up to 10 Gbps. The upstream communication in DOCSIS 3.1 uses a time division algorithm to split across flows, whereas the downstream communication is broadcast within a shared coaxial segment, with subscribers' modems configured to only read their own messages.

In a typical residential configuration, the CMTS regulates one downstream service flow (SF) per modem for all traffic flows except voice, with Quality of Service (QoS) parameters for maximum sustained traffic rate, which is the subscriber's data plan, peak traffic rate (i.e. often 1.5×-2.5× the maximum sustained rate), and maximum burst size. The CMTS controls this downstream traffic via token buckets, assuring that flows do not exceed their configured rates. Each service flow comprises a queue, a QoS parameter, and classifiers. Service flows are largely independent from each other.

Figure 3:
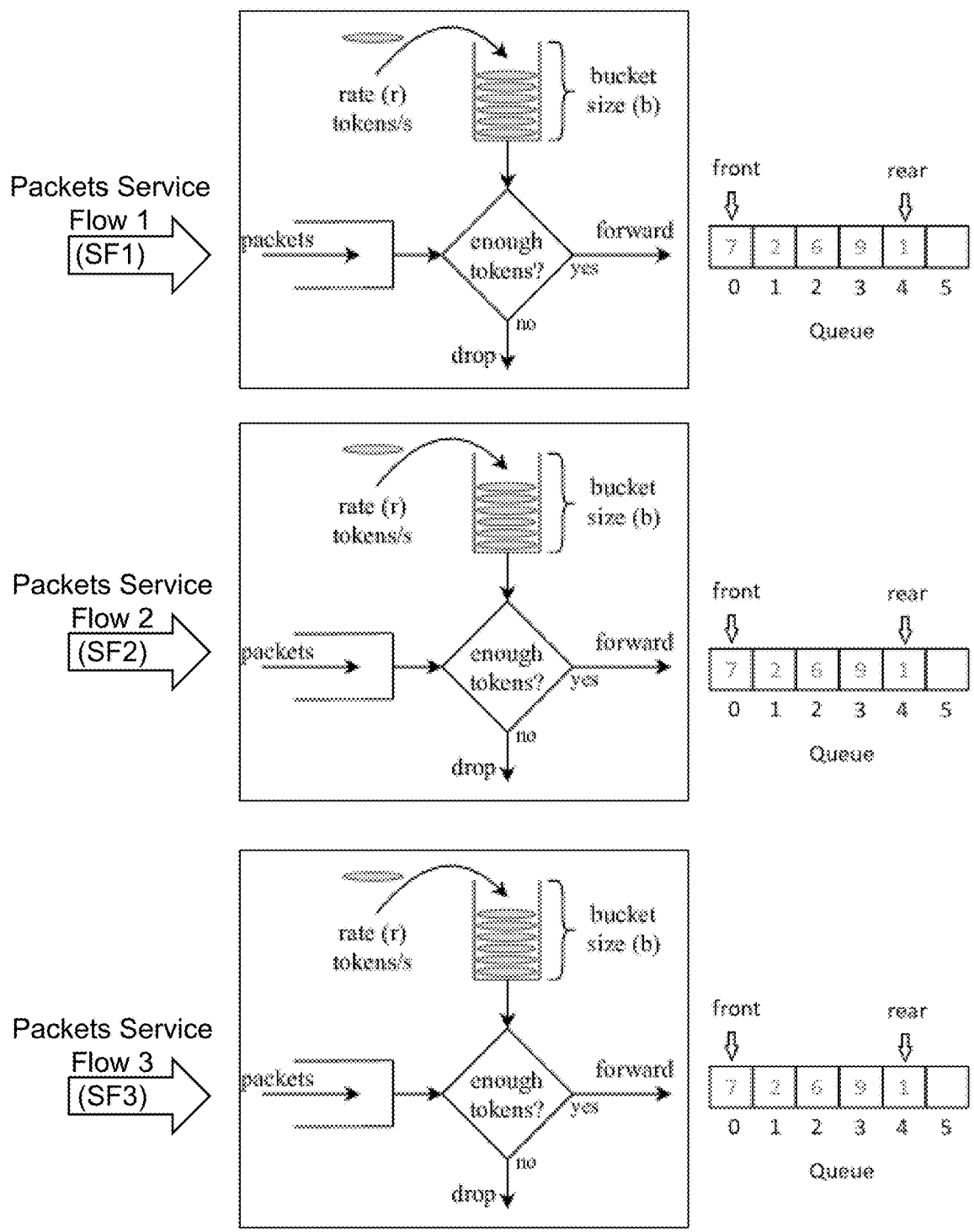
FIG. 3 shows an example of internal elements of a token bucket in a media access control (MAC) layer controller.

FIG. 3 shows an example (300) of internal elements of a token bucket in a media access control (MAC) layer controller. In this example (300), three service flows of packets (i.e. SF1, SF2, SF3) are independently processed by corresponding token buckets, each of which is assigned with rate tokens for a particular bucket size, based on each subscriber's contracted rate as indicated or implied, for instance, by the incoming packet(s). If a sufficient number of rate tokens is accumulated in a token bucket for a particular time period (e.g. 1 millisecond (ms)) and is in compliance with the subscriber's contracted rate, then that token bucket places the associated incoming service flow of packets (i.e. SF1, SF2, or SF3) in the queue for downstream processing. A packet is queued if there is an available token. In contrast, if the number of rate tokens is insufficient for an incoming service flow of packets for a particular time period (e.g. 1 ms), then that service flow of packets is dropped from further processing and denied from being placed in the queue for downstream transmission.

Figure 4:
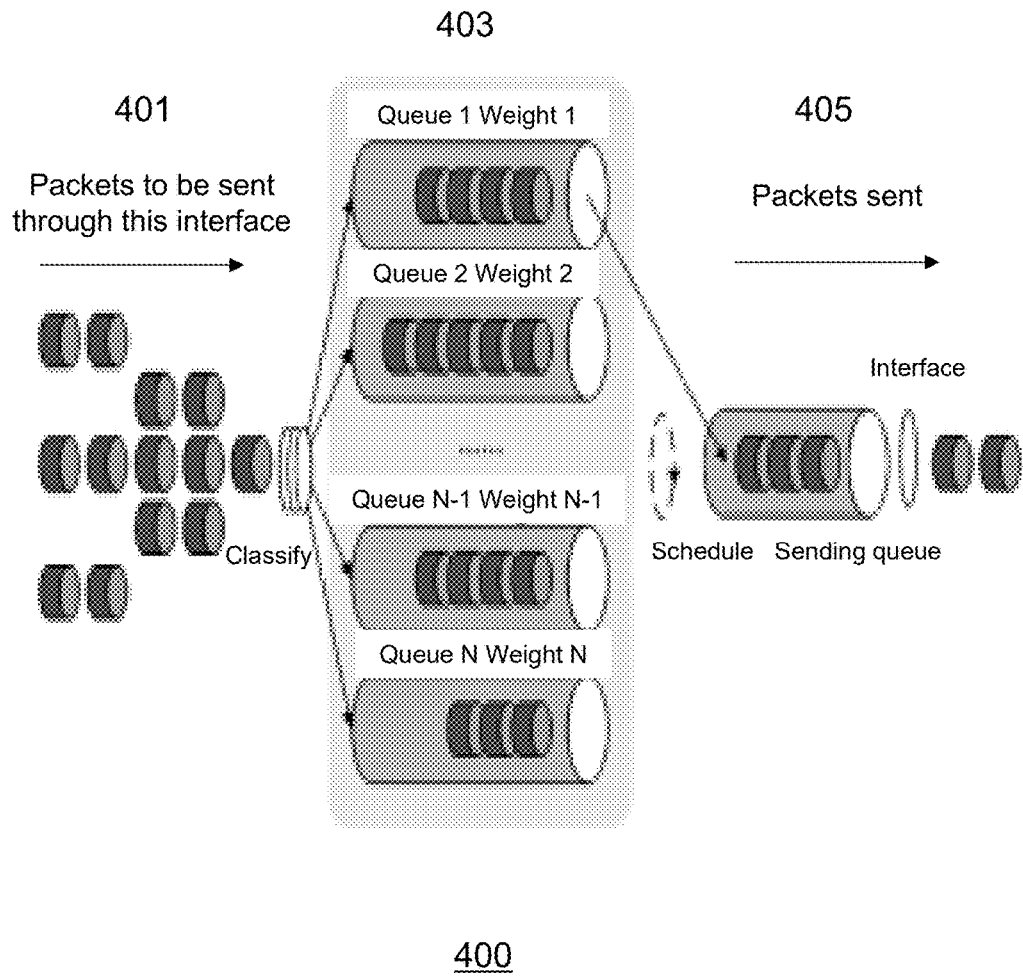
FIG. 4 shows an example of internal elements of a scheduler in a media access control (MAC) layer controller.

FIG. 4 shows an example (400) of internal elements of a scheduler in a media access control (MAC) layer controller. As illustrated in this example (400), packets (401) to be sent through this scheduler interface is classified, categorized, and placed into one or more queues (403) prior to downstream transmission. Typically, the queues (403) utilize a weighted fair queuing (WFQ) method, with implementations of the WFQ varying from one network service provider to another. In general, the WFQ allows the scheduler to specify, for each service flow, which fraction of the transmission capacity will be given based on transmission priority that may have been defined, for example, by subscribers' contracted rates of transmission. The service flow of packets placed in the queues (403) is then systematically transmitted out downstream as outgoing, or "sent" packets (405), as illustrated in FIG. 4. This transmission process may optionally involve an additional "sending queue" interface at the output terminal of the scheduler for seamless transmission of the outgoing packets (405).

As shown in the example (400) in FIG. 4, the scheduler manages the queues (403) of data packets (401), and orderly sends the packets downstream (i.e. from CMTS to modems, or from OLTs to ONTs) according to a delivery schedule. In a conventional implementation of the token bucket policing scheme in a GPON or a DOCSIS network, a token bucket filters data packets according to the contracted rate. For example, if a subscriber's modem has a contract of 300 Mbps downstream, the token rate will deliver a maximum of 300 Mbps "packets stream" to that subscriber's modem using a scheduler. In the conventional implementation of the token bucket policing scheme, this scheduler allocates a particular bandwidth to each queue according to a particular contracted rate of a subscriber, and takes the data packets out of the queue and sends them downstream based on the contracted rate of the subscriber. One way to conceptualize the magnitude of the contracted rate is using a "service flow" (SF) model. For example, if Service Flow 1 (e.g. SF1 in FIG. 3) has twice the bandwidth of Service Flow 2 (e.g. SF2 in FIG. 3), then the scheduler, as shown in FIG. 4, is configured to deliver twice as many packets for SF1 than SF2 when queues (403) are full.

Unfortunately, there are significant shortcomings and problems with the conventional MAC layer implementation. For instance, the token bucket queues or discards packets when a service flow (SF) exceeds the contracted rate, even if there is bandwidth available in the data network infrastructure. Moreover, the conventional MAC layer implementation is unable to provide optimized outputs when short-time "bursts" of packet transmission fluctuations occur. If the bandwidth temporarily increases during a short period of time, data packets will be queued even if the average bandwidth is below the contracted rate.

Mathematically, what is enforced is that the data traffic placed on DOCSIS downstream link given by TXBytes in the time interval T=(t1, t2) complies with the following rate equations:

TXBytes (t1, t2)→(t2−t1)*R/8+B
TXBytes (t1, t2)→(t2−t1)*P/8+1522 for all values t2>t1 where:
R=Maximum Sustained Traffic Rate (bps)
P=Peak Traffic Rate (bps)
B=Maximum Traffic Burst (bytes)

If the load that a SF places on the link is less than the Maximum Sustained Traffic Rate, the SF earns credit that can be used to burst at the Peak Traffic Rate when the load increases. This dynamic is important because these rate changes can induce a step function in buffering latency.

After passing through these rate limiters, the CMTS schedules the traffic for delivery across the shared medium via a Weighted Fair Queueing (WFQ) algorithm, which may be customized and specific to a particular implementation by a vendor utilized by a data network provider. Most vendors only use the WFQ to differentiate network traffic flows according to their reserved bandwidth, which means that most of the residential traffic, including adaptive bitrate (ABR) streaming video, merely utilizes the same conventional "best effort" output queue. In the current state of the art in data network management, cable networks oversubscribe customer data plans relative to network bandwidth, with typical worldwide overbooking ratios of 10:1 to 200:1. This oversubscription causes short millisecond-scale congestion intervals, during which some service flows may receive less than their maximum rate. If there is insufficient available bandwidth during peak hours, the maximum rate of all service flows is scaled back by the same percentage.

In a GPON network, the network structure is similar to the HFC (i.e. DOCSIS) network as described above, with a major difference being that fiber, and not a coaxial cable, goes up to the end-user premises. A typical GPON link has 1.24416 Gbps upstream and 2.48832 Gbps downstream, which is usually shared among 64 or 128 users. The Optical Line Terminal (OLT) equipment is similar to the CMTS. It receives traffic from the Internet router and transmits it downstream to several Optical Network Units (ONU), which connect to the end-user devices. A GPON network has a similar downstream traffic management algorithm to the HFC network, with a token bucket policy mechanism and a WFQ scheduler.

In one or more embodiments of the present invention, an optimized MAC layer management implementation with an underlying system (i.e. a novel quality-of-service (QoS)-based dynamic bandwidth allocation media access control (MAC) layer controller) and a method of operating the system are disclosed. In a preferred embodiment of the invention, the optimized downstream MAC layer may benefit by incorporating all of the following three primary objectives: (1) rate goal: enforcing contracted rates; (2) work-conserving goal: making efficient use of available capacity, by aiming to schedule traffic whenever the channel is free and at least one flow has demand; and (3) QoS goal: attempting to allocate capacity to satisfy QoS goals with network subscribers whenever possible. In contrast to the three objectives that will be satisfied in one or more embodiments of the present invention, conventional DOCSIS and GPON MAC layers only succeed in managing the first objective (i.e. rate goal). In particular, a conventional scheduler in the current state of the art is unable to achieve the second objective (i.e. work-conserving goal) or the third objective (i.e. QoS goal), which are desirable for improved optimization of the downstream MAC layer.

In a typical MAC layer management environment, each network traffic source arrives into a queue which is initially filtered by a token bucket mechanism. The filtered traffic from individual sources is scheduled downstream by a weighted fair-queueing (WFQ) scheduler, with the implementation varying by vendors. The physical (PHY) layer allocates data packets to their respective channels. The token bucket, which defines the maximum number of bytes sent in any departure period T, may be characterized by an equation, Max(T)=T*(R/8)+B, where R is the rate limit and B is the maximum traffic burst.

Even if the aggregate demand across all packet flows does not exceed the available downstream bandwidth, the token bucket filters and queues each arriving packet flow in the conventional MAC layer implementation, thus hampering the arriving flows from achieving the work-conserving goal (i.e. making efficient use of available capacity, by aiming to schedule traffic whenever the channel is free and at least one flow has demand). The inefficient behavior of the conventional approach in MAC layer management fails to provide effective optimizations in network traffic management, when short-lived spikes that exceed R occur in individual flows. In case of congestion, when an aggregate demand exceeds downstream capacity, the conventional scheduler reduces all service flow token rate proportional to their contracted token rate, thus also failing to provide any intelligent optimizations with respect to the work-conserving goal.

Furthermore, the conventional MAC layer is also insufficient to achieve the QoS goal (i.e. attempting to allocate capacity to satisfy QoS goals with network subscribers whenever possible). Conventional MAC layer management attempts to provide QoS guarantees to particular traffic by reserving bandwidth for the traffic. However, reservations make provisioning dedicated capacity to be at odds with the work-conserving goal, and Internet service providers (ISPs) typically only utilize such reservations for a few applications, such as voice and corporate services. Most network traffic of data packets, including ABR video, gaming, videoconferencing, and web browsing, only receives "best effort" service, which is insufficient to provide consistent, let alone guaranteed, quality-of-service (QoS) experience to users. Because the satisfactory user experience fundamentally depends on consistency and reliability of network performance and optimization options, an embodiment of the present invention discloses a novel MAC protocol, called "Velocity and Acceleration Network Management" (VAN), to achieve all of the three primary objectives of an optimized MAC layer implementation.

Figure 5:
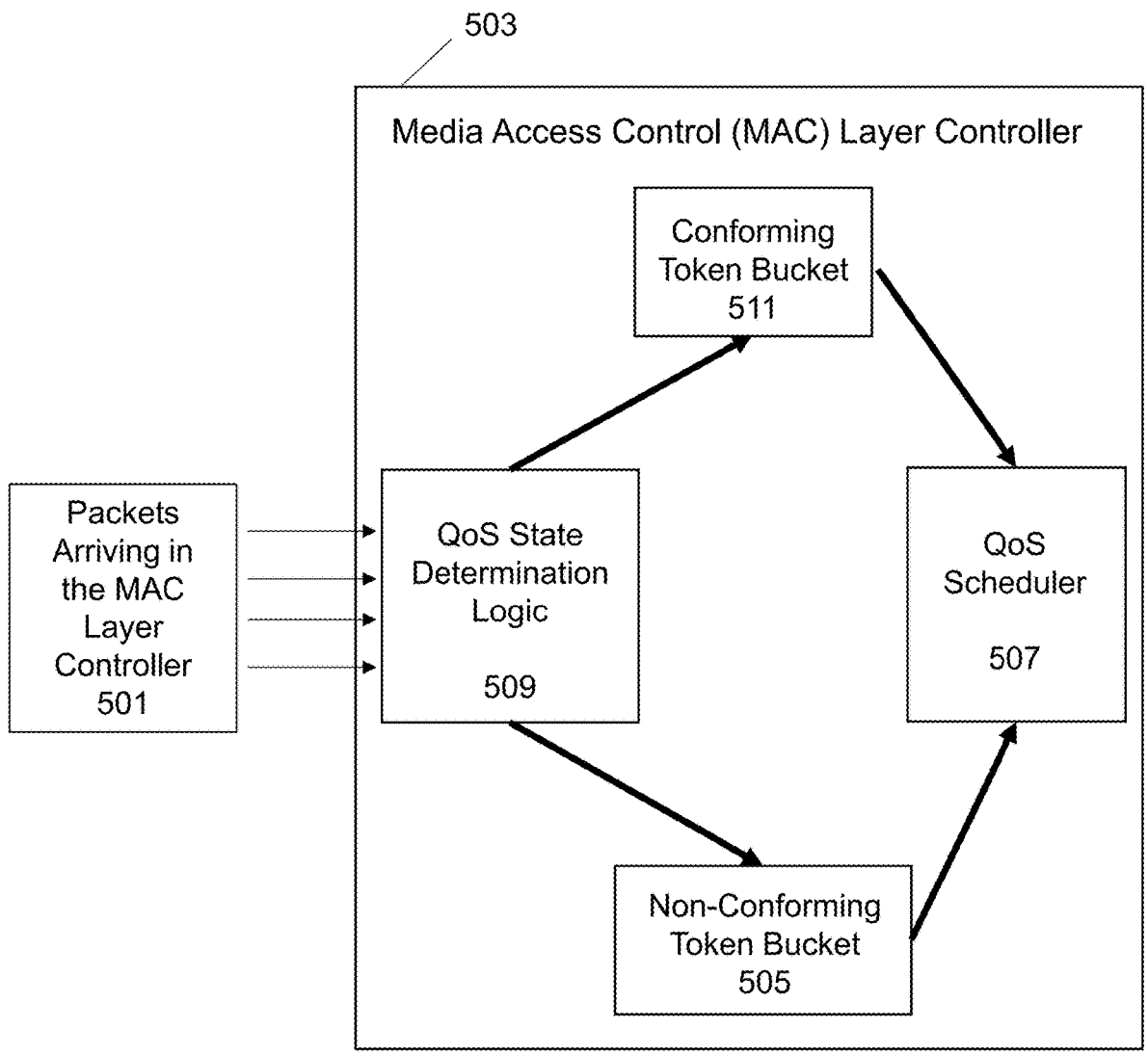
FIG. 5 shows a block diagram for novel quality-of-service (QoS)-based dynamic bandwidth allocation media access control (MAC) layer controller for MAC layer management, in accordance with an embodiment of the invention.

FIG. 5 shows a block diagram (500) for novel quality-of-service (QoS)-based dynamic bandwidth allocation media access control (MAC) layer controller for MAC layer management, in accordance with an embodiment of the invention. In a preferred embodiment of the invention, the Velocity and Acceleration Network Management (VAN) comprises at least two components in its media access control (MAC) layer controller (503), as illustrated by the block diagram (500) in FIG. 5: (1) a token bucket filter incorporated in a QoS state determination logic (509), which enforces the rate at a time granularity that depends on a service flow's (i.e. packets (501) arriving in the MAC layer controller (503)) conformity to the contracted rate; and (2) a QoS scheduler (507) which allocates downstream transmission capacity according to a given service flow's QoS goals or requirements.

Furthermore, the VAN's MAC layer controller (503) also incorporates a "conforming" token bucket (511) and a "non-conforming" token bucket (505), which take filtered and separated inputs from the QoS state determination logic (509) and accumulate either "conforming" or "non-conforming" data packets in their respective token buckets, before placing the accumulated "conforming" or "non-conforming" data packet service flows into the downstream transmission queues in the QoS scheduler (507), as illustrated in FIG. 5.

At first glance, the three objectives of the VAN may seem at odds with each other. The rate goal requires enforcing contract rates, seemingly limiting the amount of traffic that can be sent per flow and restricting the ability to achieve the work-conserving goal. Further, if flows that experience high bursts are shaped to the contracted rate, they may experience queueing delays or buffer overflow losses, which potentially interferes with the QoS goal. However, the Velocity and Acceleration Network Management (VAN), as incorporated in the preferred embodiment of the present invention, is able to fulfill the three stated objectives simultaneously and synergistically based on the following four approaches:

First, as exemplified by the block diagram (500) in FIG. 5, the QoS state determination logic (509) in the VAN measures the arrival rate of the packets (501) arriving in the MAC layer controller, and separates and/or filters them into two categories or states: (a) conforming; and (b) non-conforming. For the conforming service flow (SF) going into the conforming token bucket (511), the VAN is configured to "police" (i.e. monitor and enforce) the packet traffic rate a low time granularity at the MAC layer. In the preferred embodiment, the VAN is configured to operate the conforming token bucket (511) at each second instead of millisecond(s), which allows the SF to fluctuate within this time interval as long as it adheres to the contracted rate at every second. On the other hand, for the non-conforming SF going into the non-conforming token bucket (505), the VAN is configured to operate the non-conforming token bucket (505) at the high time (i.e. millisecond interval) granularity.

By cleverly differentiating time granularity of allowed service flow (SF) rate measurement intervals based on the arrival rate of the SF, the VAN is able to achieve the rate goal by enforcing contract rates over a more flexible and longer time scales relative to conventional approaches, for conforming service flows (SF). By stretching the time frame over which it calculates and enforces the rate, the VAN cleverly attains freedom and flexibility, compared to conventional MAC layer management schemes, to consider the other two remaining goals (i.e. work-conserving goal, QoS goal) at finer timescales and a better ability to deal with bursty and oscillating traffic of data packets, which are pervasive, for example, in the video ABR traffic.

Second, in order to accommodate the bursty and oscillating traffic at finer timescales, the VAN allows the service flows (SF) to temporarily burst over their contracted rate, if there are remaining capacity and if the SF is within the conforming state. In context of the block diagram (500) example in FIG. 5, this means that the packets accumulated in the conforming token bucket (511) may be allowed to have bursty and oscillating traffic, as long as the rate goal objective is not violated during a longer monitoring time interval (e.g. 1 second) than a conventional monitoring time interval (e.g. one or a few milliseconds). The temporary accommodation of the bursty traffic for the conforming SF enables the VAN to accomplish the work-conserving goal (i.e. making efficient use of available capacity, by aiming to schedule traffic whenever the channel is free and at least one flow has demand), while still not defying the objectives of the rate goal (i.e. enforcing contracted rates for each subscriber). In contrast, the conventional MAC layer management schemes would have dropped the accumulating packets for the rate goal violation under the rigidity of the conventional and shorter monitoring time interval (e.g. one or a few milliseconds). As long as there are packets to be transmitted downstream and the SF is within the conforming state, the QoS scheduler (507) in the VAN's MAC layer controller (503) is configured to utilize the available bandwidth, unlike the conventional MAC layer management schemes.

Third, the VAN is configured to regulate the burst rates by allocating extra capacity, compared to traditional MAC protocols, to service flows that are in danger of incurring excessive queueing delay or queue overflow loss, and by temporarily reallocating the capacity from other service flows that either have limited demand or flexibility to absorb additional delay without violating QoS goals. By dynamically adjusting allocations of network transmission and/or processing capacity, the VAN is able to achieve the QoS goal (i.e. attempting to allocate capacity to satisfy QoS goals with network subscribers whenever possible) without defying the objectives of the rate goal and the work-conserving goal. In context of the block diagram (500) in FIG. 5, the VAN's MAC layer controller (503) may utilize the QoS state determination logic (509) that includes the bucket filter, the conforming token bucket (511), the non-conforming token bucket (505), and/or the QoS scheduler (507) to assign and adjust downstream transmission capacity dynamically to multiple service flows of data packets in order to satisfy the QoS goal, while still complying to the objectives of the rate goal and the work-conserving goal in the MAC layer management.

Fourth, in order to best achieve the QoS goal, the QoS scheduler (507) in the VAN's MAC layer controller (503) looks not only at the contracted rate, but also at the traffic buffered for a service flow. The QoS scheduler (507) is also configured to project how much traffic of data packets is likely to arrive soon to the MAC layer controller (503). By projecting an impending need of network traffic processing, the MAC layer controller (503) in the VAN can be proactive, for example, by preemptively clearing the queue to prepare a likely-needed queuing capacity for the anticipated service flow without disrupting QoS targets. In the preferred embodiment of the invention, the VAN's QoS scheduler (507) may incorporate a network data packet traffic prediction module.

Conventional MAC flow control mechanisms use a token bucket that enforces a Cruz bound, which can be defined as follows: the amount of traffic allowed within a time T is given by (Max(T)=T*(R/8)+B), where R is the token rate and B is the buffer size. The token bucket constrains burstiness in the traffic exiting the CMTS/OLT, and such bounds enable deterministic bounds on the burstiness, delay, and buffering requirements downstream in the network. However, for network traffic with high oscillations, which occur, for example, in video ABR traces, unless R is much higher than the traffic's average rate, the token bucket causes long queues and packet losses. These problems occur even if downstream capacity exists and even if the flow only exceeds R when considered over relatively short time intervals. Analysis of the network traffic with high oscillations has demonstrated that the conventional, inflexible, and strict rate enforcement can cause unnecessary and inefficient network congestions, annoying service delays, and unsatisfied customers who are subscribed to a data network.

The inefficiencies of the conventional token bucket in the conventional MAC layer management system are not necessarily caused by the concept of the service flow (SF) monitoring itself, but from the time granularity of filtering and monitoring intervals that the conventional token bucket utilizes to police the SF. Typically, the conventional token bucket enforces rates at a very small-time granularity of filtering/monitoring intervals (e.g. approximately 1-10 millisecond time window). In the innovative and novel VAN system and method presented herein, the service flows (SFs) are flagged and divided into two categories (i.e. (1) conforming; (2) non-conforming), depending on a particular SF's adherence to the contracted rate at a larger time granularity.

Figure 6:
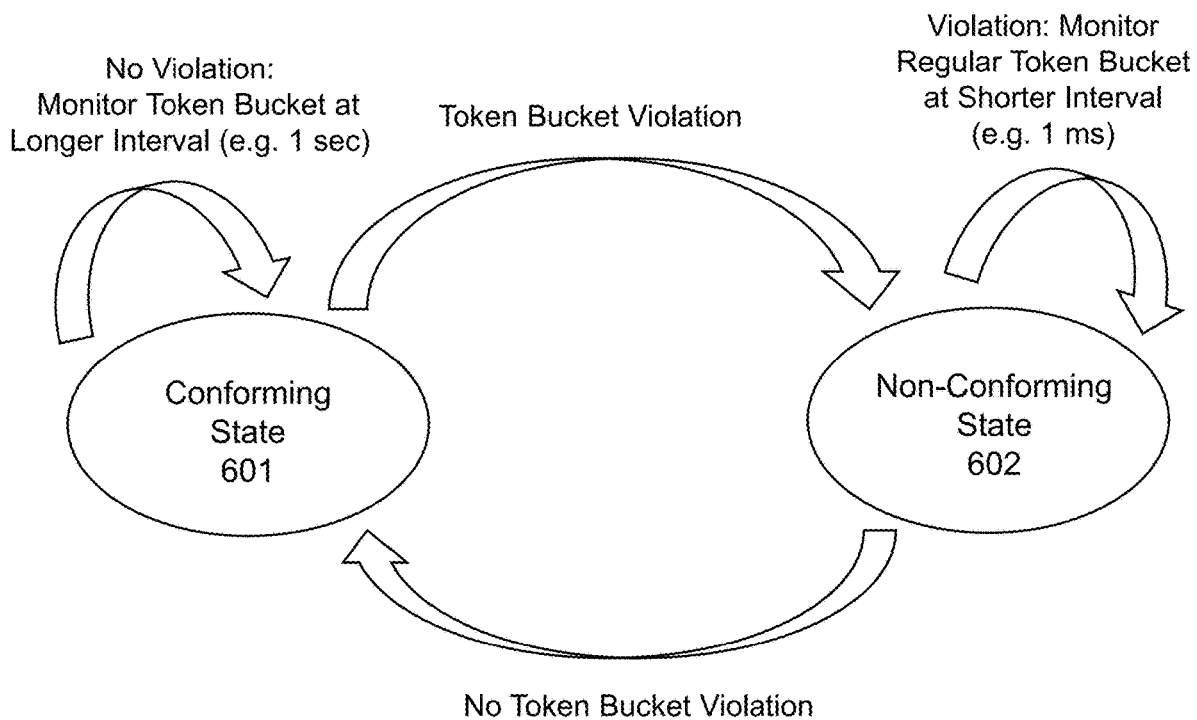
FIG. 6 shows a state diagram for quality-of-service (QoS)-based dynamic bandwidth allocation media access control (MAC) layer controller, in accordance with an embodiment of the invention.

As an exemplary case in point, FIG. 6 shows a state diagram (600) for quality-of-service (QoS)-based dynamic bandwidth allocation media access control (MAC) layer controller, in accordance with an embodiment of the invention. In this embodiment, if the incoming service flow (SF) of data packets does not have token bucket violation (e.g. a rate goal violation, transmission priority violation, etc.) over a defined period, then this particular incoming SF is categorized by the QoS state determination logic (e.g. 509 in FIG. 5) and placed into a "conforming" state (601), as shown in the state diagram (600) in FIG. 6. In the conforming state (601), the VAN's QoS-based dynamic bandwidth allocation MAC layer controller is configured to filter the rate of incoming packets service flow (SF) at a much larger time granularity than the usual practice of a few milliseconds.

For instance, in the conforming state (601), the filtering interval ($\tau$) can be defined as large as one full second in the VAN's QoS-based dynamic bandwidth allocation MAC layer controller, if the SF is conforming according to its contracted rate. The traffic of incoming packets service flow (SF) can oscillate freely within the filtering interval (i) of one second in this instance, while guaranteeing that the average rate of the SF still does not exceed the contracted rate on periods of time greater than the filtering interval (i.e. $t > \tau$).

In the embodiment of the invention where the filtering interval is one second (i.e. $\tau=1$), the VAN implements a longer-time filtering interval token bucket (i.e. "One Second Token Bucket") in the QoS-based dynamic bandwidth allocation MAC layer controller for utilization in the conforming state (601). If the SF adheres to its contracted rate when monitored on the one second filtering interval, then the VAN allows the incoming packets SF to oscillate within the one second filtering interval. Otherwise, if the SF violates the longer filtering interval (e.g. "One Second Token Bucket,"), then the QoS state determination logic (e.g. 501 in FIG. 5) in the MAC layer controller (e.g. 503 in FIG. 5) flags the current situation as a case of a longer filtering interval (i.e. one second) token bucket violation, as shown in the state diagram (600) in FIG. 6. Then, the QoS state determination logic (e.g. 501 in FIG. 5) categorizes the incoming packets as non-conforming and places them into a non-conforming state (602), wherein the filtering interval for the token bucket violation monitoring is shortened to a millisecond (i.e. 1 ms) or a few milliseconds, depending on a preferred implementation by a particular network service provider.

The shorter filtering interval for the token bucket violation in the non-conforming state (602) is configured to enforce the contracted rates on the non-conforming packet service flows (SFs), until the token bucket violation under the shorter filtering interval (e.g. 1 ms) is no longer detected by the QoS state determination logic (e.g. 501 in FIG. 5). When and if the token bucket violation stops occurring under the shorter filtering interval (e.g. 1 ms), the VAN's QoS-based dynamic bandwidth allocation MAC layer controller returns to the conforming state (601) and starts monitoring incoming packet SFs at the longer filtering interval (e.g. 1 second) again for token bucket violations, as illustrated in the state diagram (600) in FIG. 6. In the preferred embodiment of the invention, when the VAN's QoS-based dynamic bandwidth allocation MAC layer controller enters the non-conforming state (602), it may be instructed to wait a multiple "N" number of cycles for not violating the shorter filtering intervals (e.g. 1 ms) in token bucket monitoring until it can move back to the conforming state (601), where N is dictated by an exponential increase. For example, each time a service flow (SF) violates the token bucket rules, N may be multiplied by two.

Before describing the novel QoS scheduler (e.g. 507 in FIG. 5) implemented for the VAN in more detail, it may be useful to define the QoS goal analytically. To describe VAN's QoS goals, an embodiment of the present invention models the system as a discrete time, work-conserving queueing system. In this embodiment, there are "k" independent service flow arrival processes, defined as SFi, where i is in [1 . . . k], feeding k independent queues.

The independent service flow arrival processes share a common departure link with maximum departure rate C. The VAN is configured to inspect the system at each departure time, t. Let $N_i(t)$ be the workload (in bytes) in the queue at time t for service flow i.

$$N(t) = \sum_{i=1}^{k} N_i(t)$$

be the aggregate workload in the system at time t for all queues

There are a few considerations for the QoS scheduler in a work-conserving queueing system: (1) Total workload in the system (N(t)) does not depend on the scheduler mechanics; and (2) The workload on each queue $N_i(t)$ at time t depends on the scheduler mechanism. Let $A_i(t)$=be arrival workload (in bytes) at time t for service flow i.

$$A(t) = \sum_{i=1}^{k} A_i(t)$$

be the total arrival workload (in bytes) at time t.

$C_i(t)$=capacity (in bytes) allocated to $SF_1$ at time t.
$N_i(t+1)$=max (0, $N_i(t)+A_i(t)-C_i(t)$)
$N_i(0)$=0

In this embodiment of the invention, the QoS is defined as a function of maximum latency and minimum bandwidth of $SF_1$ at each time slot given by:

$L_i$=maximum workload (in bytes) of each $SF_1$ at each time t in the queue i.
$B_i$=minimum capacity allocated to each $SF_1$ at each time t (bytes per time slot).

Furthermore, the QoS goal can be mathematically defined herein as:

Minimize t∈[0 . . . ∞] such as $C_i(t) \leq B_i$ and $N_i(t) \geq L_i$
$\delta_t$=size of the time slot Because both requirements, latency and bandwidth, are concurrent, the needed capacity given by $C^{qos}$ can be expressed as $C^{qos}$=max ($B_i$, $L_i$) to serve both latency and bandwidth.

In this embodiment of the invention, the scheduler algorithm comprises two steps, first to allocate the capacity according to the QoS goal, and second to allocate, if available, the remaining capacity according to a typical WFQ algorithm:

(1.1) If N(t)<C, serve all packets in every SF queue. This is the working-conserving goal. The VAN serves all packets if there is enough capacity. The flow control algorithm takes care of the contracted rate. The scheduler does not need to police the traffic.

(1.2) Otherwise, for each $SF_1$, the VAN estimates $C_i^{qos}(t)$ $$C^{qos} = \sum_{i=1}^{k} C_i^{qos}(t)$$

(1.2.2) For each $SF_i$, the VAN allocates capacity according to the following logic:
(1.2.3) if $C<C^{qos}$, then $C_i(t)=C^{qos}/C*C_i^{qos}(t)$
(1.2.4) if $C>C^{qos}$, then $C_i(t)=C_i^{qos}(t)$ This is the QoS goal where capacity is allocated to achieve a given QoS (2.1) If there is leftover capacity after allocating $C^{qos}$ given by $C_{leftover}=(C-C^{qos})>0$, then the VAN allocates $C_{leftover}$ according to the WFQ algorithm.

In this embodiment of the invention, the VAN guarantees the capacity allocation initially to achieve the QoS and then the remaining capacity is allocated using a conventional WFQ method, according to the workload in each queue.

In the preferred embodiment of the invention, the VAN, which incorporates the QoS-based dynamic bandwidth allocation MAC layer controller (e.g. 503 in FIG. 5), is a discrete time system with time intervals t (time slots) of one hundred milliseconds (100 ms). At each time slot, there may be a packet arrival defined in bits.

Let Y(t) be the workload arriving at time t defined by number of bits arriving during this time interval t:

V(t)=Y(t)−Y(t−1)/t be the velocity at time t in bits per time interval
A(t)=(V(t)−V(t−1)/t be the acceleration at time t.

In order to create an effective estimator, $\hat{V}(t+1)$, the VAN is configured to compute the averages $\bar{V}(t)$ and $\bar{Y}(t)$ over a sliding window of size 10. Furthermore, the VAN can define the conditions as follows:

$$\bar{V}(t+1) = \sum_{i=t-10}^{t} V(i), \text{ where } i \text{ is in } [10 \ldots \infty]$$

$$\bar{A}(t+1) = \sum_{i=t-10}^{t} A(i), \text{ where } i \text{ is in } [10 \ldots \infty]$$

σA(t) is equal to the standard deviation of A(t) over the same sliding window of t=10
Therefore, $\hat{V}(t+1)=\bar{V}(t)+\bar{A}(t)+/-\sigma A(t)$ In the preferred embodiment of the invention, the VAN is configured to operate under three different scenarios, assuming that the naïve estimator is defined as $\hat{V}(t+1)=V(t)$:

Scenario 1: $\hat{V}(t+1)=\bar{V}(t)$
Scenario 2: $\hat{V}(t+1)=\bar{V}(t)+\bar{A}(t)$
Scenario 3: $\hat{V}(t+1)=\bar{V}(t)+\bar{A}(t)++/-\sigma A(t)$ In the preferred embodiment of the invention, the performance of the traffic prediction module can be estimated by computing the Mean Absolute Error (MAE) for these three scenarios. In one empirical case, a greater than 90 percent accuracy in traffic prediction was achieved using realistic network traffic data samples. At least in some implementations of the VAN in accordance with the preferred embodiment of the invention, it may be desirable to incorporate the traffic prediction module, which is mathematically defined above, into the VAN's QoS scheduler (e.g. 507 in FIG. 5) for a highly-optimized MAC layer management by utilizing the novel QoS-based dynamic bandwidth allocation MAC layer controller (e.g. 503 in FIG. 5).

Various embodiments of the present invention provide several key advantages in MAC layer management for data networks. One advantage of an embodiment of the present invention is providing a novel electronic system and a method of its operation that enable flexible and efficient MAC layer management via intelligent and dynamic allocation of available network capacity in data packet queuing and downstream transmission scheduling.

Moreover, another advantage of an embodiment of the present invention is providing a novel electronic system and a method of its operation that can reliably accommodate and enforce a quality-of-service (QoS) goal in a downstream MAC layer whenever possible.

In addition, another advantage of an embodiment of the present invention is providing a novel electronic system and a method of its operation that can generate and utilize a realistic forecasting model of incoming network traffic, wherein the realistic forecasting model takes account of the current state of network traffic as well as future traffic arrivals, and enables the novel electronic system to allocate available bandwidth dynamically for optimal resource utilization and efficiency.

Furthermore, another advantage of an embodiment of the present invention is providing a novel quality-of-service (QoS)-focused dynamic bandwidth allocation method to a data network service provider to enhance its network subscriber satisfaction rates in terms of minimized network congestions, speed degradations, and downtimes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a quality-of-service (QoS)-based dynamic bandwidth allocation media access control (MAC) layer controller in a data network, the method comprising the steps of:

receiving multiple service flows of data packets in the QoS-based dynamic bandwidth allocation MAC layer controller, wherein each service flow in the multiple service flows of data packets represents data communication with a specific subscriber's device connected to the data network;

utilizing a QoS state determination logic in the QoS-based dynamic bandwidth allocation MAC layer controller to determine and categorize each service flow in the multiple service flows to be either in a conforming state or in a non-conforming state, wherein a service flow is categorized as conforming if a token bucket violation does not occur within a longer filtering interval of token bucket monitoring, and wherein the service flow is categorized as non-conforming if the token bucket violation occurs within the longer filtering interval;

placing the service flow into a conforming token bucket if the QoS state determination logic categorized the service flow to be in the conforming state, wherein the conforming token bucket utilizes the longer filtering interval to monitor and detect a future token bucket violation from the service flow;

placing the service flow into a non-conforming token bucket if the QoS state determination logic categorized the service flow to be in the non-conforming state, wherein the non-conforming token bucket utilizes a shorter filtering interval to monitor and detect the future token bucket violation from the service flow;

redirecting the service flow going to the non-conforming token bucket to the conforming token bucket and re-categorizing a current state to be in the conforming state, if the QoS state determination logic does not detect the future token bucket violation under the shorter filtering interval of the non-conforming token bucket in the non-conforming state for a defined number of monitoring cycles;

queuing the service flow of data packets that have been monitored, categorized, and filtered by the conforming token bucket and the non-conforming token bucket in a quality-of-service (QoS) scheduler for downstream transmission; and transmitting the service flow to nodes external to the QoS-based dynamic bandwidth allocation MAC layer controller in the data network.

2. The method of claim 1, wherein the step of queuing the service flow of data packets in the QoS scheduler for downstream transmission further comprises a first step of allocating the data network's transmission capacity according to a QoS goal, followed by a second step of allocating the data network's remaining transmission capacity according to a weighted fair queuing (WFQ) method.

3. The method of claim 1, further comprising a step of incorporating a network data packet traffic prediction module in the QoS scheduler to optimize utilization of the data network's transmission capacity based on anticipated incoming multiple service flows, as indicated by the network data packet traffic prediction module.

4. The method of claim 1, wherein the QoS-based dynamic bandwidth allocation MAC layer controller simultaneously prioritizes a rate goal that enforces contracted rates, a work-conserving goal that makes efficient use of available network capacity by aiming to schedule traffic whenever possible, and a QoS goal that attempts to allocate network capacity to provide satisfactory QoS to subscribers whenever possible.

5. The method of claim 1, wherein the token bucket violation is a rate goal violation, a transmission priority violation, or another rule violation monitored by the conforming token bucket or the non-conforming token bucket.

6. The method of claim 1, wherein the longer filtering interval of token bucket monitoring is 1 second, and the shorter filtering interval is 1 millisecond (ms).

7. The method of claim 1, wherein the QoS-based dynamic bandwidth allocation MAC layer controller is incorporated into a data network equipment for gigabit passive optical networks (GPON) or Data Over Cable Service Interface Specification (DOCSIS) networks.

8. The method of claim 1, wherein the QoS-based dynamic bandwidth allocation MAC layer controller is able to reduce unnecessary packet droppages, network congestions, and speed degradations by utilizing the QoS state determination logic to direct the service flow flexibly to either the conforming token bucket monitored under the longer filtering interval or the non-conforming token bucket monitored under the shorter filtering interval.

9. The method of claim 1, wherein the QoS-based dynamic bandwidth allocation MAC layer controller, which operates two distinct states and switches between the conforming state and the non-conforming state based on the token bucket violation and the future token bucket violation, reduces unnecessary packet droppages, network congestions, and speed degradations during processing of oscillating and bursty network traffic, which is prevalent in adaptive bitrate (ABR) streaming video.

* * * * *